United States Patent Office 3,119,821
Patented Jan. 28, 1964

3,119,821
OXADIAZINES
Donald L. Trepanier, Indianapolis, Ind., assignor to The Dow Chemical Company, Midland, Mich., a corporation of Delaware
No Drawing. Filed May 14, 1962, Ser. No. 194,693
3 Claims. (Cl. 260—244)

This invention is directed to novel oxadiazines bearing a 5-member heterocyclic ring substituent wherein the hetero-atom is oxygen or sulphur. More particularly, the invention is directed to novel dihydro-1,3,4-oxadiazines having the formula

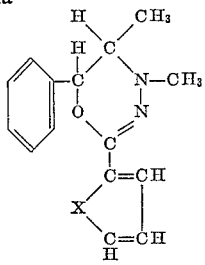

(I)
wherein X represents oxygen or sulphur. The novel compounds are crystalline solids, soluble in a variety of organic solvents such as halohydrocarbons and aliphatic ketones and ethers, somewhat soluble in lower alkanols, and relatively insoluble in water.

The new compounds may be prepared by cyclization with the elimination of water from N-(acylamino) substituted ephedrines and pseudoephedrines having the formula

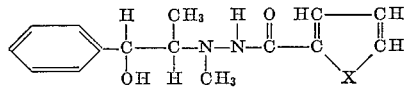

(II)
wherein X represents oxygen or sulphur. Such substituted ephedrines and pseudoephedrines are disclosed and claimed in my copending application, Serial No. 194,691, filed concurrently herewith.

In carrying out the reaction for the preparation of the novel substituted oxadiazines, a substituted ephedrine or pseudoephedrine of Formula II above is blended with concentrated sulphuric acid in the proportions of about 1 part by weight of the former to from about 5 to 20 parts by weight of the latter at a temperature of from about 10° to 40° C., and the resulting solution is poured onto crushed ice. The aqueous mixture so obtained is extracted with a water-immiscible, organic solvent, such as chloroform, and the extracts are washed, dried and evaporated under vacuum to obtain the desired substituted oxadiazine as a solid residue. Such a product may be purified by conventional procedures such as recrystallization from suitable organic solvents.

The compounds of the invention have been shown to have activity as monoamine oxidase inhibitors. Such activity is a characteristic of agents useful as antidepressants or psychic energizers.

The following examples illustrate the invention but are not to be construed as limiting the same.

*Example 1*

40 grams of N(2-thiophenecarbonylamino)-1-ephedrine was added, portionwise with swirling, and cooling as needed, to 300 grams of concentrated sulphuric acid. The resulting mixture was maintained for 18 hours at room temperature, then poured onto crushed ice. The resulting aqueous mixture was extracted successively with several portions of chloroform. The chloroform extracts were combined, washed with aqueous sodium bicarbonate solution and then with water, and dried over anhydrous sodium sulphate. The dried chloroform solution was evaporated under vacuum to recover the chloroform and to obtain the desired product as a residue in the form of a yellowish solid. The latter was recrystallized twice from isopropyl alcohol to produce 4,5-dimethyl-6-phenyl-2(2-thienyl)-5,6-dihydro-4H-1,3,4-oxadiazine as a crystalline solid, melting at 133°–135° C. This product was found to contain 65.9 percent carbon, 6.09 percent hydrogen and 10.38 percent nitrogen, by analysis, as compared to theoretical values of 66.1 percent carbon, 5.92 percent hydrogen and 10.29 percent nitrogen, calculated for the assigned structure of the substituted oxadiazine.

*Example 2*

1 - (2 - furoyl) - 2 - methyl - 2(1 - methyl - 2 - hydroxy-2-phenylethyl) hydrazine hydrochloride was added, portionwise with stirring, to concentrated sulphuric acid in the proportions of 25 grams of said hydrazine hydrochloride to 80 milliliters of the concentrated sulphuric acid. The resulting solution was maintained at room temperature for 18 hours, then poured onto crushed ice. The mixture was worked up by extraction with chloroform, washed and dried as in Example 1, and the solvent removed under diminished pressure to obtain the crude reaction product as a brown, solid residue. The latter was twice recrystallized from isopropyl alcohol to obtain the 4,5-dimethyl-6-phenyl-2(2-furyl)-5,6-dihydro-4H-1,3,4-oxadiazine as a crystalline solid, melting at 141°–142° C. This product was found to contain 70.28 percent by weight of carbon, 6.51 percent of hydrogen and 11.01 percent of nitrogen, by analysis, as compared to percentages of 70.29, 6.29 and 10.93, respectively, calculated for the named structure.

*Example 3*

The administration of 3,4-dihydroxyphenyl-L-alamine (DOPA) at a dosage of 200 milligrams per kilogram to a normal mouse has very little visible effect. When given to mice which have been pretreated with known antidepressants of the monoamine oxidase inhibitor class, such a dose of DOPA results in excitement in the mice. In a representative operation, an aqueous suspension of 4,5-dimethyl-6-phenyl-2(2-furyl)-5,6-dihydro-4H-1,3,4-oxadiazine was administered to albino mice by intraperitoneal injection on four successive days at a dosage rate of 100 milligrams of the oxadiazine compound per kilogram each day. About two hours after the final injection of the oxadiazine compound, DOPA was administered by intraperitoneal injection at a dosage of 200 milligrams per kilogram in each mouse and the treated animals were held in observation cages. Shortly after the administration of DOPA, the treated mice showed excitement and hyperirritability characteristic of monoamine oxidase inhibition, which continued for at least two hours.

Somewhat higher doses of the corresponding thienyloxadiazine compound are required for similar effectiveness.

I claim:
1. A substituted dihydro-oxadiazine of the formula
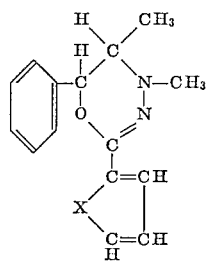
wherein X is selected from the group consisting of oxygen and sulphur.
2. 4,5-dimethyl-6-phenyl-2(2-thienyl)-5,6-dihydro-4H-1,3,4-oxadiazine.
3. 4,5-dimethyl-6-phenyl-2(furyl)-5,6-dihydro-4H-1,3,4-oxadiazine.
No references cited.